United States Patent
Lange et al.

(10) Patent No.: US 11,312,664 B2
(45) Date of Patent: Apr. 26, 2022

(54) CERAMIC HEAT SHIELDS HAVING A REACTION COATING

(71) Applicant: Siemens Energy Global GmbH & Co. KG, Munich (DE)

(72) Inventors: Friederike Lange, Ratingen-Lintorf (DE); Ivo Krausz, Berlin (DE); Christian Nikasch, Mülheim an der Ruhr (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 473 days.

(21) Appl. No.: 16/315,754

(22) PCT Filed: Jul. 10, 2017

(86) PCT No.: PCT/EP2017/067235
§ 371 (c)(1),
(2) Date: Jan. 7, 2019

(87) PCT Pub. No.: WO2018/011126
PCT Pub. Date: Jan. 18, 2018

(65) Prior Publication Data
US 2020/0109088 A1 Apr. 9, 2020

(30) Foreign Application Priority Data

Jul. 14, 2016 (DE) .................... 10 2016 212 872.8

(51) Int. Cl.
*C04B 41/45* (2006.01)
*C04B 41/00* (2006.01)
(Continued)

(52) U.S. Cl.
CPC ........ *C04B 41/4556* (2013.01); *C04B 41/009* (2013.01); *C04B 41/0072* (2013.01);
(Continued)

(58) Field of Classification Search
CPC ............ C04B 41/4556; C04B 41/0072; C04B 41/009; C04B 41/4539; C04B 41/4543;
(Continued)

(56) References Cited

U.S. PATENT DOCUMENTS 5,154,885 A 10/1992 Czech et al.
5,993,980 A 11/1999 Schmitz et al.
(Continued)

FOREIGN PATENT DOCUMENTS

DE 10133209 A1 2/2003
DE 102006030235 A1 1/2008
(Continued)

OTHER PUBLICATIONS

Translation and bib Data—WO-2008000247-A1; Klemm et al; Jan. 2008 (Year: 2008).*
(Continued)

*Primary Examiner* — Todd E Manahan
*Assistant Examiner* — Rene D Ford

(57) ABSTRACT

A ceramic heat shield for a gas turbine. The ceramic heat shield has a ceramic body containing aluminium oxide and has a surface layer of the ceramic body which contains yttrium aluminium garnet as reaction coating material. A gas turbine includes such a ceramic heat shield and a method produces such a ceramic heat shield.

7 Claims, 2 Drawing Sheets

(51) Int. Cl.
  *C04B 41/50* (2006.01)
  *C04B 41/87* (2006.01)
  *F02C 7/24* (2006.01)
  *F23R 3/00* (2006.01)

(52) U.S. Cl.
  CPC ...... *C04B 41/4539* (2013.01); *C04B 41/4543* (2013.01); *C04B 41/5032* (2013.01); *C04B 41/87* (2013.01); *F02C 7/24* (2013.01); *F23R 3/007* (2013.01); *F05D 2220/32* (2013.01); *F05D 2230/90* (2013.01); *F05D 2240/35* (2013.01); *F05D 2300/21* (2013.01); *F05D 2300/50211* (2013.01); *F05D 2300/611* (2013.01)

(58) Field of Classification Search
  CPC ....... C04B 41/5032; C04B 41/87; F02C 7/24; F23R 3/007; F23R 2900/00018; F23R 3/002; F05D 2220/32; F05D 2230/90; F05D 2240/35; F05D 2300/21; F05D 2300/50211; F05D 2300/611; F05D 2300/2112
  See application file for complete search history.

(56) References Cited

U.S. PATENT DOCUMENTS

| | | |
|---|---|---|
| 6,231,692 B1 | 5/2001 | Vogt et al. |
| 6,294,260 B1 * | 9/2001 | Subramanian ...... C23C 28/3455 428/469 |
| 2002/0012791 A1 * | 1/2002 | Morita .................... C04B 41/87 428/336 |
| 2003/0051811 A1 * | 3/2003 | Uchimaru ......... H01J 37/32559 156/345.1 |
| 2003/0078156 A1 | 4/2003 | Lowden et al. |
| 2003/0207151 A1 | 11/2003 | Stamm |
| 2004/0011439 A1 | 1/2004 | Corrigan et al. |
| 2005/0118331 A1 | 6/2005 | Ruud et al. |
| 2006/0113009 A1 | 6/2006 | Burgel et al. |
| 2009/0162539 A1 | 6/2009 | Boutwell et al. |
| 2010/0086790 A1 | 4/2010 | Schumann et al. |
| 2011/0151239 A1 * | 6/2011 | Lane ..................... C04B 35/632 428/312.8 |
| 2014/0263579 A1 | 9/2014 | Kulkarni et al. |
| 2015/0044444 A1 * | 2/2015 | Gell ......................... C23C 4/11 428/220 |
| 2015/0345313 A1 | 12/2015 | Kulkarni et al. |

FOREIGN PATENT DOCUMENTS

| | | |
|---|---|---|
| DE | 112014001276 T5 | 12/2015 |
| DE | 112008003399 B4 | 8/2016 |
| EP | 0412397 A1 | 2/1991 |
| EP | 0486489 A1 | 5/1992 |
| EP | 0786017 A1 | 7/1997 |
| EP | 1204776 A1 | 5/2002 |
| EP | 1306454 A1 | 5/2003 |
| EP | 1319729 A1 | 6/2003 |
| WO | 9967435 A1 | 12/1999 |
| WO | 0044949 A1 | 8/2000 |
| WO | WO-2008000247 A1 * | 1/2008 ............. C04B 41/87 |
| WO | 2008068071 A1 | 6/2008 |

OTHER PUBLICATIONS

PCT International Search Report and Written Opinion of International Searching Authority dated Sep. 28, 2017 corresponding PCT International Application No. PCT/EP2017/067235 filed Oct. 7, 2017.

* cited by examiner

CERAMIC HEAT SHIELDS HAVING A REACTION COATING

CROSS REFERENCE TO RELATED APPLICATIONS

This application is the US National Stage of International Application No. PCT/EP2017/067235 filed Jul. 10, 2017, and claims the benefit thereof. The International Application claims the benefit of German Application No. DE 10 2016 212 872.8 filed Jul. 14, 2016. All of the applications are incorporated by reference herein in their entirety.

FIELD OF INVENTION

The invention relates to a ceramic heat shield for a gas turbine, to a gas turbine having such a ceramic heat shield, and to a process for producing such a ceramic heat shield.

BACKGROUND OF INVENTION

Shielding from the high temperatures that arise in operation in the interior of gas turbines is provided by ceramic heat shields mounted along the hot gas pathway. During use in operation, the ceramic heat shields show corrosion and erosion on their side facing the hot gas. This process originates from the corrosion of the mullite present in the ceramic material, which is converted to secondary corundum on contact with the hot gas. This secondary corundum in turn has a lower mechanical strength than the surrounding ceramic material and is therefore removed by the hot gas stream. This exposes larger parts of the microstructure until they ultimately become detached from the surface of the ceramic heat shield and are carried away by the hot gas. The particles can cause damage to the protective coatings of the turbine blades (thermal barrier coatings—TBC), which can lower the lifetime of the turbine blades.

An existing method for this purpose is to provide the hot gas side of the ceramic heat shield with an aluminum oxide coating (DE 11 2008 003 399 B4). Aluminum oxide has much greater hot gas stability than mullite, but likewise shows limited lifetime on contact with hot gas.

The aluminum oxide coating can be applied to the heat shield by a slip spraying method or a flame spraying method. In this case, a coating of thickness about 300 micrometers is typically applied. An aluminum oxide coating applied by slip spraying methods shows a relatively fine-grain structure that has a tendency to further sintering, cracking and premature crumbling in the operation of the gas turbine. If, by contrast, a flame spraying method is used, the coating becomes relatively dense and brittle, and is therefore unable to follow the deformations of the ceramic heat shield during the operation of the gas turbine. Here too, this leads to cracking and progressive detachment of the coating. For these reasons, the lifetime of such aluminum coatings is limited to about 8000 operating hours, and even shorter lifetimes can be expected in the case of gas turbines that reach particularly high hot gas temperatures. The coating itself constitutes a further source of particles with the above-described adverse effects on the turbine blades and extends the lifetime of the ceramic heat shields only to an inadequate degree.

SUMMARY OF THE INVENTION

It is therefore an object of the invention to provide ceramic heat shields with extended lifetime.

A first aspect of the invention therefore introduces an improved ceramic heat shield for a gas turbine. The ceramic heat shield has an aluminum oxide-containing ceramic body. According to the invention, a surface layer of the ceramic body contains yttrium aluminum garnet (YAG) as reaction coating material. A reaction coating material is understood here to mean a material that forms by chemical reaction with the material of a surface after the application of a reaction coating former to the surface or the coating of the surface with a reaction coating former, the surface of the ceramic body here. Since at least a proportion of the reaction coating former penetrates into the surface, what is formed is a surface layer containing the reaction coating material.

The reaction coating material yttrium aluminum garnet has high hot gas stability and protects the aluminum oxide-containing ceramic body from attack by hot gas. For the formation of yttrium aluminum garnet, it is possible to use an yttrium-containing reaction coating former, e.g. an yttrium oxide- or yttrium nitrate-containing reaction coating former, that penetrates into the ceramic body through pores and, after the reaction of the reaction coating former with the aluminum oxide to give YAG, covers and hence particularly reliably protects all surfaces of the heat shield that the hot gas can reach via the same pathways. Corrosion or erosion of the ceramic material of the ceramic body and hence of the heat shield no longer takes place as a result, or is at least greatly restricted. Fewer ceramic particles, if any, become detached from the ceramic heat shield, which also causes correspondingly less damage to the TBC layers of the turbine blades.

Preferably, a base material of the ceramic body consists of aluminum oxide, the base material being understood to mean the residual material of the ceramic body not formed by yttrium aluminum garnet. A suitable base material for the ceramic body is the material manufactured by Siemens under the "SiCerm E100" name.

The combination of aluminum oxide and YAG has the particular advantage that the coefficients of thermal expansion of aluminum oxide and YAG are almost identical. However, the better the match of the coefficients of thermal expansion of the reaction coating material and the base material of the ceramic body to one another, the smaller the risk of erosion by the action of hot gas.

A concentration of the reaction coating material advantageously decreases from a surface of the ceramic heat shield into the depths of the surface layer. This forms a transition between the reaction coating material down to the base material of the ceramic body, which is advantageous because the attack of hot gas proceeds from the surface of the ceramic heat shield. More particularly, no interface layer forms between the reaction coating material (YAG) and the base material of the ceramic body (aluminum oxide), which could result in undesirable stresses or inhomogeneities.

The surface layer advantageously has a thickness of at least 400 micrometers. Smaller depths lead to reduced protection of the ceramic body of the heat shield.

The surface layer may extend across an end face of the ceramic body and across lateral faces of the ceramic body. This is a further particular advantage of the invention over conventional coatings because these require application of typically 200 to 400 micrometers of coating material, which meant that coating between adjacent ceramic heat shields was not viable to date owing to the change in dimensions of the heat shields as a result of the coating. The yttrium-containing reaction coating former to be applied for production of the heat shield of the invention, by contrast, penetrates into the ceramic body of the heat shield and permeates the surface layer, which means that the dimensions of the ceramic heat shield remain unchanged and it is possible to protect even the lateral faces of the ceramic heat shield that are prone to sporadic penetration of hot gas.

A second aspect of the invention relates to a gas turbine having a ceramic heat shield of the invention.

The invention additionally introduces a process for producing an improved ceramic heat shield for a gas turbine. The process has at least the following steps: —providing an aluminum oxide-containing ceramic body; and—producing a surface layer of the ceramic body containing yttrium aluminum garnet as reaction coating material.

The production process of the invention can produce a ceramic heat shield for a gas turbine with prolonged lifetime. The reaction coating material yttrium aluminum garnet is particularly resistant to hot gas and covers the surfaces of the ceramic body that can be reached by the hot gas, such that the hot gas that flows within the gas turbine during operation is unable, or nearly unable, to erode the ceramic heat shield. More advantageously, the production of the yttrium aluminum garnet-containing surface layer comprises a step of applying a liquid reaction coating former to the ceramic body. The reaction coating former may, for example, be a solution, a sol or a suspension. For example, the reaction coating former may contain yttrium nitrate or $Y_2O_3$, which can form a YAG such as $Y_3Al_5O_{12}$ with $Al_2O_3$ present in the ceramic body. The YAG is the reaction coating material produced by the reaction of the reaction coating former and the ceramic material.

Advantageously, the yttrium-containing reaction coating former can penetrate into the ceramic body, such that the YAG-containing surface layer forms part of the ceramic body and there is no change in the dimensions of the ceramic body. Thus, the protective surface layer can also be formed on the end faces of the heat shield, which was not possible to date owing to the change in dimensions that results from the application of a coating. The process of the invention can thus be incorporated into existing production processes in a simple manner, since there is no need to take account of any change in the dimensions.

Such a YAG phase, by comparison with other refractory materials, is virtually insensitive to hot gas and can thus give lasting protection of the surface of the ceramic heat shield from attack by hot gas. The penetration depth of the reaction coating former can be affected by the viscosity thereof. The concentration of the reaction coating material produced in this way in the surface layer of the ceramic heat shield can likewise be adjusted via the corresponding content in the reaction coating former.

The production of the yttrium aluminum garnet-containing surface layer may also include a step of sintering or co-sintering the ceramic body after the application of the liquid reaction coating former. As a result of the sintering, the reaction coating former reacts with the aluminum oxide in the ceramic body and thus forms the yttrium aluminum garnet-containing surface layer.

The step of sintering may advantageously correspond to a firing operation that has already been used to date for the production of ceramic heat shields. This means that known manufacturing methods for ceramic heat shields can be extended in a simple manner to include a step of applying the liquid reaction coating former which is executed prior to the firing of the ceramic heat shield, in which case it is possible to use the tools and methods used to date in otherwise unchanged form. The sintering can therefore be executed in the form of a "co-sintering" operation, wherein not only the formation of the YAG by means of sintering but also sintering of the base material of the ceramic body takes place.

The sintering or co-sintering of the ceramic body can be effected at a temperature of at least 650 degrees Celsius, advantageously at least 1500 degrees Celsius. In general, temperatures above about 650 degrees Celsius are employable, although such low temperatures require fine grinding levels of the reactants. In order to assure low manufacturing costs, however, the use of a comparatively coarse-grain ceramic material for the ceramic body is proposed, which results in the higher temperature mentioned for the sintering or co-sintering. In the manufacture of ceramic heat shields, firing temperatures above 1500 degrees Celsius are customary, and so these conventional firing operations can fulfill the demands of the process of the invention in unchanged form.

The liquid reaction coating former can, for example, be sprayed or brushed onto the ceramic body. The ceramic body can likewise be dipped into the liquid reaction coating former. A spraying method is easy to implement in technical terms and achieves uniform application of the liquid reaction coating former on flat surfaces. In the case of uneven surfaces, for example in the groove region, this method achieves comparatively inhomogeneous application, and so brush application of the liquid reaction coating former is advantageous here. In general, it is advantageous to match the application method to the surface to be treated in each case.

The liquid reaction coating former can be applied under reduced pressure, which promotes deeper penetration of the reaction coating former into the ceramic body.

The step of providing the ceramic body may include steps of making up a ceramic body base material, shaping, setting and drying. This corresponds to standard production steps for conventional ceramic heat shields, and so it is possible to adapt existing production processes in a simple manner for the invention.

BRIEF DESCRIPTION OF THE DRAWINGS

The invention is elucidated in detail hereinafter with reference to figures of working examples. The figures show.

DETAILED DESCRIPTION OF INVENTION

Figure 1:
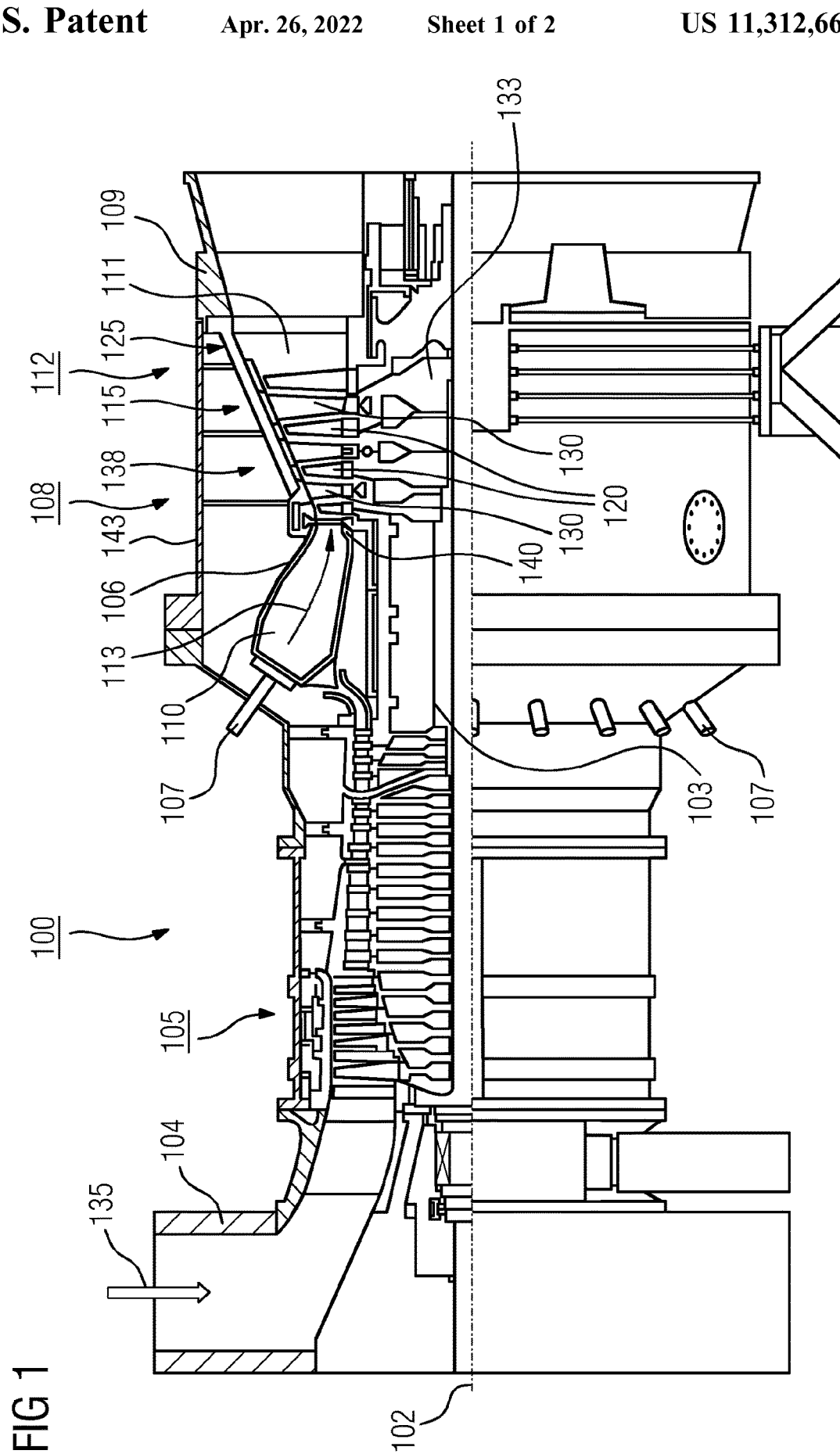
FIG. 1 an illustrative gas turbine 100 in a partial longitudinal section.

FIG. 1 shows, by way of example, a gas turbine 100 in a partial longitudinal section. The gas turbine 100 has, in its interior, a rotor 103 which is rotatably mounted about an axis of rotation 102 and has a shaft 101 which is also referred to as turbine rotor.

Moving along the rotor 103, the following occur in succession: a suction housing 104, a compressor 105, a combustion chamber 110 in torus-like form for example, especially an annular combustion chamber, with multiple burners 107 in coaxial arrangement, a turbine 108 and the offgas housing 109.

The annular combustion chamber 110 communicates with a hot gas duct 111 in annular form for example. Four turbine stages 112 in series, for example, form the turbine 108 therein.

Each turbine stage 112 is formed, for example, from two blade rings. Viewed in flow direction of a working medium 113, in the hot gas duct 111, a guide blade series 115 is followed by a row 125 formed from rotor blades 120.

These guide blades 130 are secured to an inner housing 138 of a stator 143, whereas the rotor blades 120 of a row 125 are mounted on the rotor 103, for example, by means of a turbine disk 133.

Coupled to the rotor 103 is a generator or an engine (not shown).

During the operation of the gas turbine 100, the compressor 105 sucks in air 135 through the suction housing 104 and compresses it. The compressed air provided at the turbine end of the compressor 105 is guided to the burners 107, where it is mixed with a combustion medium. The mixture is then combusted to form the working medium 113 in the combustion chamber 110. The working medium 113 thence flows along the hot gas duct 111 past the guide blades 130 and the turbine blades 120. At the turbine blades 120, the working medium 113 is decompressed in a momentum-transferring manner, such that the turbine blades 120 drive the rotor 103 and the latter drives the engine coupled thereto.

The components exposed to the hot working medium 113 are subject to thermal stresses during the operation of the gas turbine 100. The guide blades 130 and turbine blades 120 of the first turbine stage 112 viewed in flow direction of the working medium 113 are the most thermally stressed, along with the ceramic heat shields that line the annular combustion chamber 110.

In order to withstand the temperatures that exist therein, these may be cooled by means of a cooling medium.

Substrates of the components may likewise have a directed structure, meaning that they are monocrystalline (SX structure) or have only longitudinally directed grains (DS structure).

Materials used for the components, especially for the turbine blades 120, 130 and components of the combustion chamber 110, are, for example, iron-, nickel- or cobalt-based superalloys.

Superalloys of this kind are known, for example, from EP 1 204 776 B1, EP 1 306 454, EP 1 319 729 A1, WO 99/67435 or WO 00/44949.

The blades 120, 130 may have coatings to counter corrosion or oxidation, e.g. MCrAlX (M is at least one element from the group of iron (Fe), cobalt (Co), nickel (Ni), X is an active element and is yttrium (Y) and/or silicon and/or at least one element from the rare earths or hafnium (Hf)). Such alloys are known from EP 0 486 489 B1, EP 0 786 017 B1, EP 0 412 397 B1 or EP 1 306 454 A1.

A protective aluminum oxide layer (TGO=thermal grown oxide layer) forms atop the MCrAlX layer (as interlayer or as outermost layer).

A thermal insulation layer, which is advantageously the outermost layer, may also be present atop the MCrAlX and consists, for example, of $ZrO_2$, $Y_2O_3$—$ZrO_2$, meaning that it is not stabilized, partly stabilized or fully stabilized by yttrium oxide and/or calcium oxide and/or magnesium oxide. The thermal insulation layer advantageously covers the entire MCrAlX layer.

Figure 2:
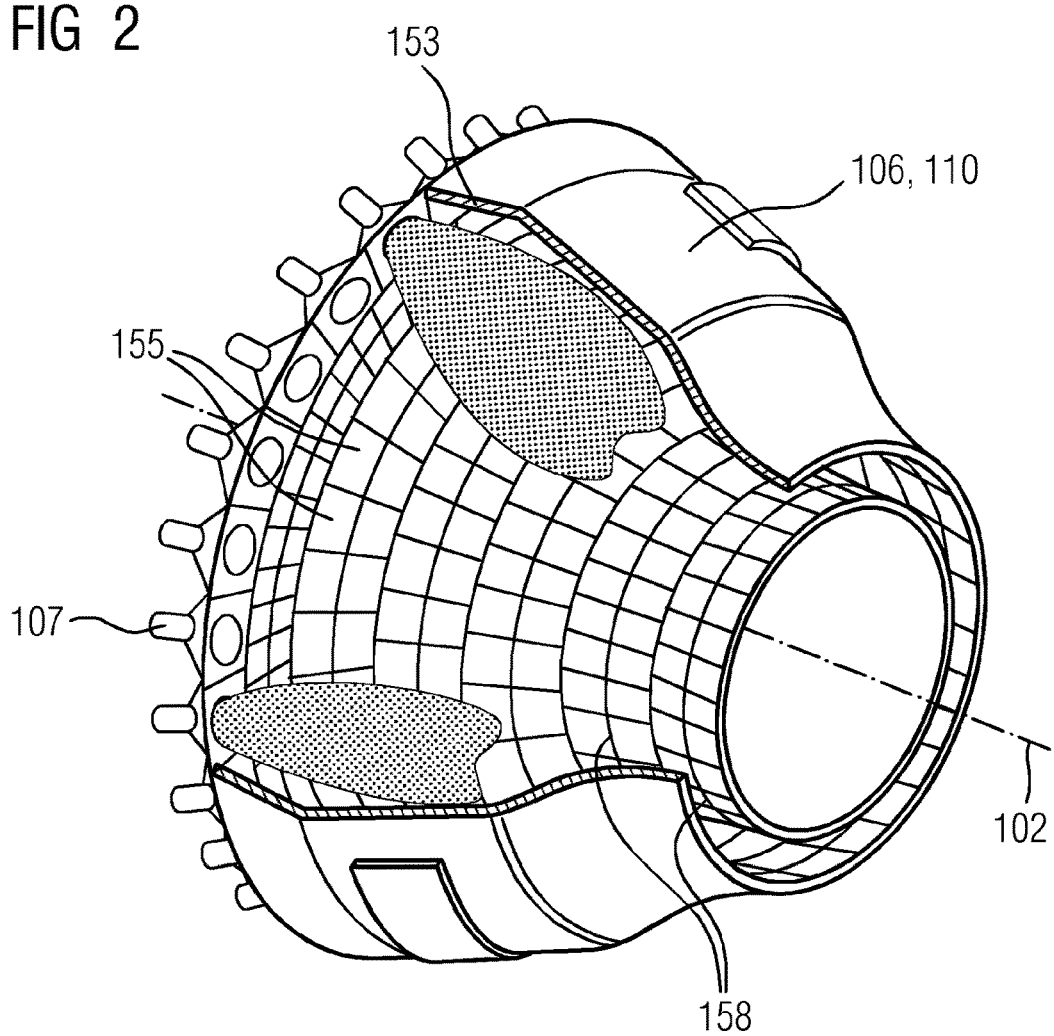
FIG. 2 a combustion chamber 110 of a gas turbine.

FIG. 2 shows a combustion chamber 110 of a gas turbine. The combustion chamber 110 is configured, for example, as what is called an annular combustion chamber in which a multitude of burners 107 arranged around an axis of rotation 102 in circumferential direction open into a common combustion chamber space 154, which generate flames 156. For this purpose, the combustion chamber 110 in its entirety is configured as an annular structure positioned about the axis of rotation 102.

To achieve a comparatively high efficiency, the combustion chamber 110 is designed for a comparatively high temperature of the working medium M of about 1000 degrees Celsius to 1600 degrees Celsius. In order to enable a comparatively long lifetime even with these operating parameters, which are unfavorable for the materials, the combustion chamber wall 153, on its side facing the working medium M, has been provided with an inner lining formed from ceramic heat shields 155.

Owing to the high temperatures in the interior of the combustion chamber 110, a cooling system may be provided for the heat shield elements 155 or for the holding elements thereof.

Figure 3:
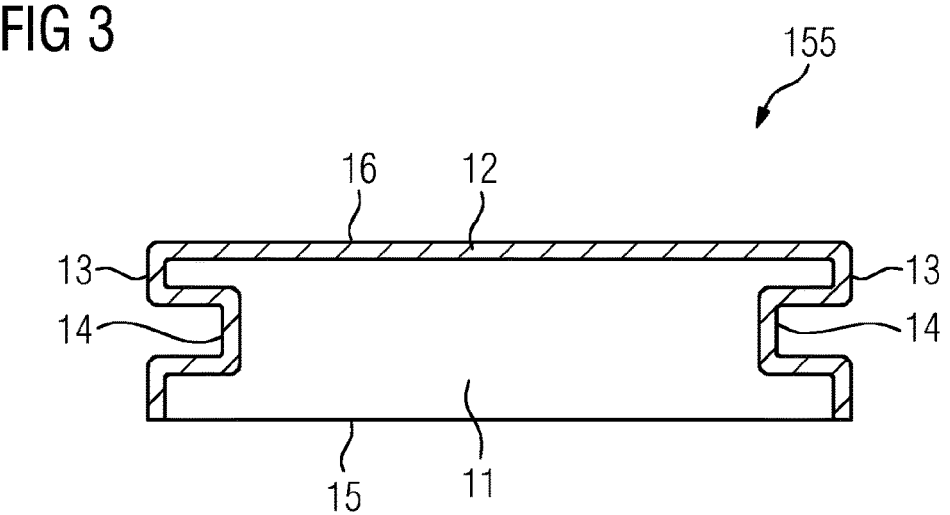
FIG. 3 a working example of an inventive heat shield 155.

FIG. 3 shows a working example of a ceramic heat shield 155 of the invention. The heat shield 155 is shown in a cross-sectional drawing and has, merely by way of example, a groove 14 on each of its two opposite lateral faces 13 which is intended to serve as a recess for a metallic holding clamp (not shown) disposed behind a reverse side 15 of the heat shield 155. The lateral faces of the heat shield 155 in the upstream and downstream directions are usually not equipped with grooves. The heat shield 155 has an aluminum oxide-containing ceramic body 11 which, according to the invention, has a surface layer 12 containing yttrium aluminum garnet as reaction coating material.

The surface layer 12, in the example shown, extends across the lateral faces 13 and one end face 16 of the ceramic heat shield 155 that is directly exposed to the hot gas in operation. The surface layer 12 contains hot gas-resistant YAG and covers all surfaces of the ceramic body 11 that the hot gas can reach. For example, an yttrium oxide-containing liquid may be applied as reaction coating former to the surface of the aluminum oxide-containing ceramic body. A subsequent co-sintering operation then gives rise to the YAG, such that a YAG-containing surface layer 12 is formed.

Working examples of the invention with this material combination result in further advantages:

When yttrium reacts with aluminum oxide, there is a slight increase in the volume of the corundum crystal lattice. This leads to a certain compressive stress in the YAG-containing surface layer. The compressive stress thus introduced counteracts the curvature of the surface of the ceramic heat shield that occurs in the operation of the gas turbine in the form of a prestress. In the case of formation of a dome of the ceramic heat shield, in gas turbine operation, therefore, it is first necessary to overcome the compressive stress in the YAG-containing surface layer and then the tensile strength of the material before there can be cracking in the surface layer. The YAG-containing surface layer is thus much less sensitive to cracking than existing alumina coatings which, owing to their fine-grain structure and the associated propensity to further sintering (slip coating) or brittle structure (flame coating), are if anything under tensile stress and hence have an increased tendency to cracking. However, such cracks constitute a first weak point that can allow attack of hot gas on unprotected areas of the ceramic heat shield 155 and hence function as erosion starters.

Even though the invention has been further illustrated and elucidated in detail by working examples, the invention is not restricted by the examples disclosed. Variations thereof can be inferred by the person skilled in the art without leaving the scope of protection of the invention as defined in the claims which follow.

The invention claimed is:

1. A process for producing a ceramic heat shield for a gas turbine comprising:

providing an aluminum oxide-containing ceramic body; and producing a surface layer of the ceramic body containing yttrium aluminum garnet as reaction coating material, wherein the production of the yttrium aluminum garnet-containing surface layer comprises a step of applying a liquid reaction coating former to the ceramic body, and wherein the reaction coating former comprises yttrium nitrate.

2. The process of claim 1, wherein the production of an yttrium aluminum garnet-containing surface layer comprises a step of sintering or co-sintering of the ceramic body after the application of the liquid reaction coating former.

3. The process of claim 2, wherein the sintering or co-sintering of the ceramic body is effected at a temperature of at least 650 degrees Celsius.

4. The process of claim 3, wherein the sintering or co-sintering of the ceramic body is effected at a temperature of at least 1500 degrees Celsius.

5. The process of claim 1, wherein the liquid reaction coating former is sprayed or brushed onto the ceramic body or wherein the ceramic body is dipped into the liquid reaction coating former.

6. The process of claim 1, wherein liquid reaction coating former is applied under negative pressure.

7. The process of claim 1, wherein the step of providing the ceramic body comprises steps of making up a ceramic body base mixture, shaping, setting and drying.

\* \* \* \* \*